United States Patent [19]
Yan

[11] Patent Number: 4,895,708
[45] Date of Patent: Jan. 23, 1990

[54] REMOVAL OF MERCURY FROM NATURAL GAS

[75] Inventor: Tsoung Y. Yan, Philadelphia, Pa.

[73] Assignee: Mobil Oil Corporation, New York, N.Y.

[21] Appl. No.: 188,088

[22] Filed: Apr. 27, 1988

Related U.S. Application Data

[63] Continuation of Ser. No. 905,990, Sep. 10, 1986, abandoned.

[51] Int. Cl.[4] .............................................. B01D 53/34
[52] U.S. Cl. .................................. 423/210; 423/220; 423/228; 423/232
[58] Field of Search ............... 423/210, 561 B, 561 A, 423/562, 220, 228, 229, 232; 55/72

[56] References Cited

U.S. PATENT DOCUMENTS

| | | | |
|---|---|---|---|
| 3,194,629 | 7/1965 | Dreibelbis et al. | 423/210 |
| 3,331,657 | 7/1967 | Peter et al. | 423/562 |
| 3,545,916 | 12/1970 | Deicher et al. | 423/228 |
| 4,044,098 | 8/1977 | Miller et al. | 423/210 |
| 4,101,631 | 7/1978 | Ambrosini et al. | 423/210 |
| 4,496,371 | 1/1985 | Urban et al. | 423/232 |

FOREIGN PATENT DOCUMENTS

| | | | |
|---|---|---|---|
| 20224 | 2/1983 | Japan | 423/210 |
| 325980 | 2/1972 | U.S.S.R. | 55/72 |
| 833287 | 5/1981 | U.S.S.R. | 423/210 |

OTHER PUBLICATIONS

"Dehydration of Manufactured Gas", Speer, American Gas Association, 1926 Convention, pp. 1–6.
Mellor, A Comprehensive Treatise On Inorganic And Theoretical Chemistry, Longmans, Green and Co., 1947, vol. X, p. 103.

*Primary Examiner*—John Doll
*Assistant Examiner*—Jeffrey Edwin Russel
*Attorney, Agent, or Firm*—Alexander J. McKillop; Charles J. Speciale

[57] ABSTRACT

Natural gas containing mercury is treated for liquifaction by contacting it with alkali and amine treating units to remove carbon dioxide and hydrogen sulfide. The amine and alkali treating units also contain sulfur in reacted form. This serves to guard downstream equipment against failure of upstream mercury-removing equipment, namely sulfur, on a selected support.

3 Claims, 1 Drawing Sheet

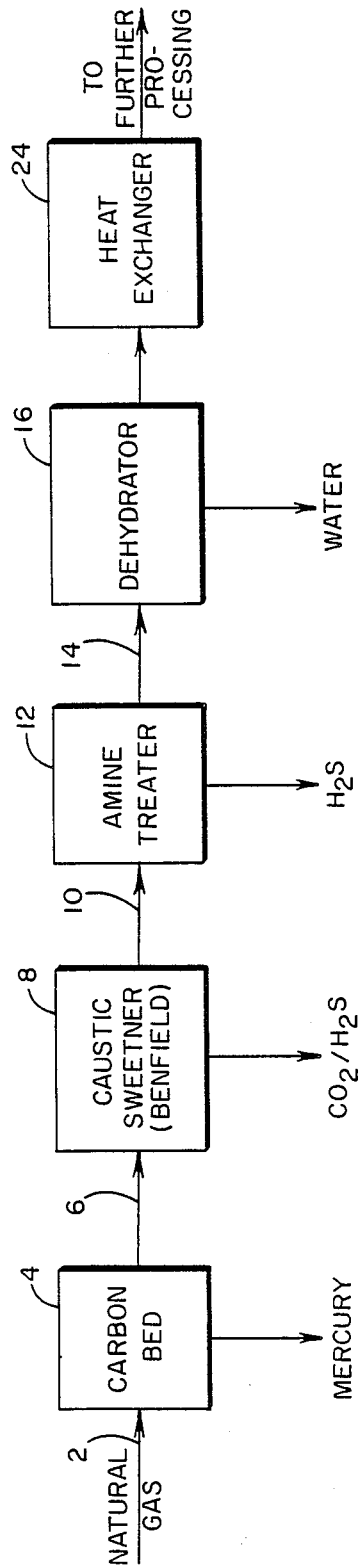

REMOVAL OF MERCURY FROM NATURAL GAS

This is a continuation of application Ser. No. 905,990 filed Sept. 10, 1986, now abandoned.

NATURE OF THE INVENTION

This invention relates to a method for purifying and removing trace amounts of mercury and mercury compounds from raw natural gas.

PRIOR ART

Raw natural gas must be treated prior to its liquefaction for several reasons. These include removing compounds which interfere with the liquefaction process, with the separation and recovery of hydrocarbon liquids and with meeting the specifications set for the recovered products. For example, the gas must be dried to prevent ice formation during cryogenic operations. Hydrogen sulfide ordinarily must be removed because of its toxic nature. A large number of commercial processes are in use for treating and separating of raw wellhead gas. The steps used in these different processes are each well known to those skilled in the art.

Some natural gas contains mercury at levels as high as 200 to 300 micrograms per cubic meter. For example, the mercury level of natural gas produced at one field in Indonesia is about 250 micrograms per cubic meter. Concentrations of mercury at this level creates safety hazards and air pollution problems. Refinery equipment such as heat exchangers can be adversely effected by the action of accumulated mercury. The problem of mercury in natural gas is discussed further in U.S. Pat. No. 4,094,777 and French Patent 2,310,795, both of which are incorporated herein by reference.

Accordingly, one object of this invention is to remove the mercury present in natural gas to a concentration sufficiently low to protect liquefaction equipment in a liquefied natural gas plant. Another object is to minimize the release of mercury vapors into the environment. Still another objective is to provide a process for mercury removal which can be integrated into current gas purification systems at existing LNG plants.

DESCRIPTION OF THE DRAWING

The FIGURE is a flow sheet presenting one embodiment of the invention described herein.

SUMMARY OF THE INVENTION

In a broad sense this invention comprises a process for treating raw natural gas prior to liquefaction which comprises (a) passing a stream of raw natural gas through a zone containing activated carbon impregnated with sulfur, at conditions effective to remove mercury from said natural gas; (b) passing the effluent stream of natural gas thus treated through a sweetening zone operating at conditions effective to remove carbon dioxide and hydrogen sulfide therefrom and to thereby effect the formation of a stream of sweetened natural gas, and/or passing the effluent stream therefrom through an amine treating system wherein additional hydrogen sulfide is removed, (c) subsequently passing the effluent through a dehydrator where water vapor is removed and (d) finally passing the effluent through a heat exchanger to a further product treatment zone. In either or both the sweetening zone and the amine treating zones sulfur is added in dissolved and/or colloidal or other fine form to react with free mercury present in the effluent gas.

This technique is particularly effective for preventing excessive amounts of mercury from getting to the critical aluminum heat exchangers downstream when the upstream mercury removing unit (sulfur on activated carbon, for example) malfunctions.

The reaction involved between mercury and sulfur in dissolved or colloidal form is

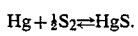

The reaction here is the same as the reaction between sulfur on the carbon support in the upstream mercury removal unit and subject to nearly the same thermodynamic equilibrium limitations.

The temperature in the alkali carbonate unit is 180° to 200° F. Thus the excess mercury break-through due to malfunction of the mercury remover can be reacted with sulfur rapidly to the thermodynamic equilibrium level. Since this temperature is higher than that of the mercury remover upstream, it cannot remove the residual mercury when the mercury remover is operated normally and effectively. Thus, this technique is particularly effective in alleviating the potential problem due to malfunction of the mercury remover upstream. On the other hand, the amine unit is operated at 100°–160° F., which is lower than that of the Hg remover, leading to a more favorable thermodynamic equilibrium value. Thus, this technique can significantly reduce the residual mercury even when the mercury remover is operated efficiently. The ratio of residual mercury present at 170° F. to that present at 120° F. is about 30. Thus, when sulfur is added to the amine unit operating at 120° F., it can reduce the residual from mercury remover to between 0.03 and about 0.001 ppb.

DETAILED DESCRIPTION OF THE INVENTION

Referring now to the accompanying drawing, natural gas feed is introduced through line 2 into carbon bed 4 which contains free sulfur deposited on granulated carbon. The bed functions to fix or adsorb a large fraction of the mercury vapor present in the natural gas by interaction with the sulfur. When this unit is operated normally, the mercury levels in the sulfur effluent gas can be reduced from 0.03 to 0.1 ppb. However, due to accidental and/or operational difficulty, it malfunctions from time to time leading to breakthrough of excess mercury. When this mercury reaches downstream, aluminum heat exchangers can be ruined irreversibly. The present invention can effectively alleviate this problem. Additionally, since the amine unit is operated at temperature lower than the Hg removal unit of 170° F., the sulfur added to the amine unit can reduce the residual Hg from the normal operations. The effluent gas therefrom is then introduced from line 6 into a zone 8 containing preferably a hot aqueous solution of an alkali carbonate, preferably potassium carbonate, at a temperature of about 200° F. to about 300° F. In this hot carbonate solution there is maintained dissolved sulfur or suspension of free sulfur in colloidal form which reacts with the mercury present in the gas to form mercury compounds. These hot carbonate processes for sweetening natural gas are known in the art. Most of them contain a proprietary activator, for example the Benfield process, the Catacarb process and the Giammarco-Vetrocoke process. These processes are discussed in U.S. Pat. Nos. 4,150,962 and 4,070,165, both of which are incorporated herein by reference. In, for example, the Benfield unit, the sulfur is dissolved and suspended in a colloidal free form at a concentration between 10 and 10,000 ppm in the hot carbonate solution. The sulfur concentration of such a low level does not interfere with normal process operation. The effluent from the hot carbonate process is carried through conduit 10 to an amine treating unit 12 for additional processing. The amine solution can also contain free sulfur and forms additional mercuric sulfide to reduce the mercury level further. The mercuric sulfide formed ordinarily will not exceed 0.2 pounds per year so that it will not interfere with normal operation. The effluent from the amine treater 12 is flowed by means of conduit 14 through a dehydrator 16 where water vapor is removed from the gas and subsequently into a heat exchanger 24 and on to further processing, i.e., drying, cooling, and liquefaction to produce LNG.

What is claimed is:

1. In a process for treating raw natural gas containing mercury wherein said natural gas is contacted with an aqueous solution of an alkali carbonate and/or an amine to remove carbon dioxide and hydrogen sulfide, the improvement comprising contacting the natural gas with free elemental sulfur on a support, and, independently of said natural gas, contacting the natural gas with said aqueous solution of alkali carbonate and/or amine, to which 10 to 10,000 ppm of free, reactive elemental sulfur in dissolved or colloidal form has been added.

2. In a process for treating raw natural gas containing mercury wherein said natural gas is contacted with amine to remove carbon dioxide and hydrogen sulfide, the improvement comprising contacting the natural gas with free elemental sulfur in a carbonate solution, and then treating the natural gas with said amine containing, independently of said natural gas, between about 10 and about 10,000 ppm of free reactive elemental sulfur.

3. The process of claim 2 wherein said natural gas prior to treatment with an amine is contacted with free elemental sulfur on a support.

* * * * *